United States Patent Office 3,838,066
Patented Sept. 24, 1974

3,838,066
METHOD FOR STABILIZING PYROPHORIC
MATERIALS IN A CATALYST BED
Lyle M. Lovell, Portage, Ind., assignor to Standard
Oil Company, Chicago, Ill.
No Drawing. Filed Oct. 1, 1971, Ser. No. 185,839
Int. Cl. B01j 11/04, 11/30, 11/76
U.S. Cl. 252—419                          6 Claims

ABSTRACT OF THE DISCLOSURE

The method comprises the sequential steps of (1) passing an inert gas through the catalyst bed at a bed temperature that is below the ignition temperature of coke and any additional non-pyrophoric material in the bed; and (2) adding a controlled amount of oxygen-containing gas to the inert gas to oxidize the pyrophoric material. Preferably, the method comprises an additional step of maintaining the oxygen partial pressure at about 0.3 to 1 atmosphere of oxygen for a time that is sufficient to eliminate any temperature rise that may occur in the bed when the amount of oxygen-containing gas is increased.

BACKGROUND OF THE INVENTION

Many catalytic processes are being employed in industry today. This is especially true for the petroleum industry. Quite often, the catalyst in such a process remains in service for many months, even years. During this time, pyrophoric material, such as iron sulfide, form and accumulate throughout the bed of catalyst. This occurs, for example, in the catalyst beds employed in the various hydrotreating processes, e.g., hydrodesulfurization processes and hydrocracking processes. In many instances, the catalysts are used for long periods of time without regeneratoin. The absence of regeneration permits the build up of this pyrophoric iron sulfide.

In the event that a maintenance or pressure-drop problem arises in the interior of a reactor, the unit must be shut down or the reactor taken out of service and the catalyst must be removed from the reactor to permit such maintenance. In a situation where such problem arises and there is no need to regenerate the catalyst, the catalyst cannot be removed from the reactor without some sort of treatment to deactivate or stabilize the pyrophoric material. If such stabilization is not performed, the pyrophoric material will spontaneously ignite with serious consequences to the catalyst bed, when the catalyst is exposed to air. A previous treatment to minimize such spontaneous ignition has been the wetting of the catalyst bed with either hydrocarbons or water during the catalyst removal. However, if any of the catalyst dries, spontaneous ignition of the pyrophoric material will more than likely occur.

In an analogous situation, the nickel catalyst employed in certain processes for the synthesis of ammonia gas possesses a pyrophoric nature. The tendency of this nickel catalyst to spontaneously ignite and burn is as great as that of pyrophoric iron sulfide found in hydrotreating reactors. It has been found that the pyrophoric condition of the nickel catalyst can be deactivated or stabilized by the bleeding of a stream of air up through the bed of said catalyst under carefully controlled conditions. When such a treatment was employed to deactivate or stabilize pyrophoric iron sulfide found in the catalyst bed of a hydrotreating process, the heat release was so great that the treatment was unable to effectively stabilize the iron sulfide without burning of the coke on the catalyst, no matter how carefully the air was bled into the reactor.

Now there has been found a method for stabilizing pyrophoric materials, such as iron sulfide. This method can be used advantageously to treat the contents of a catalytic reactor. After such a treatment, the catalyst can be exposed to air in a dry state and removed from the reactor. Any iron sulfide therein has been pyrophorically deactivated.

SUMMARY OF THE INVENTION

Broadly, according to the invention, there is provided a method for stabilizing pyrophoric materials in a catalyst bed, which method comprises the following steps in sequence: (1) passing an inert gas through said bed at a bed temperature that is below both the ignition temperature of coke and the ignition temperature of any additional combustible material that is not pyrophoric; (2) adding a controlled amount of oxygen-containing gas to said inert gas to provide sufficient oxygen to oxidize said pyrophoric material, said bed temperature being maintained below said ignition temperatures; and (3) maintaining said controlled amount of oxygen-containing gas until any temperature rise that occurs in said bed has been eliminated.

The method may also comprise an additional step. The method further comprises increasing the amount of oxygen-containing gas at the same temperature and pressure to provide an oxygen partial pressure within the range of about 0.3 to 1 atmosphere of oxygen for a period of time that is sufficient to eliminate any temperature rise that occurs in said bed when the oxygen concentration of oxygen-containing gas is increased.

A typical pyrophoric material is pyrophoric iron sulfide and a suitable oxygen-containing gas for use in this method is air. Typically, the temperature of the catalyst bed is maintained within a range of about 100° F. to about 500° F. and the oxygen is added to provide an oxygen concentration of about 0.1 volume percent to about 2.0 volume percent.

DESCRIPTION

According to the present invention, there is provided a method for stabilizing pyrophoric materials in a catalyst bed. An example of such pyrophoric materials is pyrophoric iron sulfide, which accumulates throughout the catalyst bed during the use of the catalyst to promote one or more chemical reactions. As an example, pyrophoric iron sulfide accumulates during the use of a hydrodesulfurizing unit to hydrodesulfurize mineral hydrocarbon streams.

Broadly, there is provided a method for stabilizing pyrophoric materials in a catalyst bed, which method comprises the following steps in sequence: (1) passing an inert gas through said bed at a bed temperature that is below both the ignition temperature of coke and the ignition temperature of any additional combustible material that is not pyrophoric; (2) adding a controlled amount of an oxygen-containing gas to said inert gas to provide sufficient oxygen to oxidize said pyrophoric materials, said bed temperature being maintained below said ignition temperatures; and (3) maintaining said controlled amount of oxygen-containing gas until any temperature rise that occurs in said bed has been eliminated.

The temperature rise is the result of the burning of the pyrophoric materials under the controlled conditions. Suitable inert gases may be nitrogen, or flue gas, or any inert gas that will not deleteriously affect the catalyst in the bed. Any oxygen-containing gas may be employed as the source of oxygen. Suitable, air may be employed as the oxygen-containing gas. During the method of the present invention, the bed temperature must be maintained below the ignition temperatures of either coke, that is, hydrocarbonaceous deposits on the catalyst, or any additional combustible material that is not pyrophoric. The oxygen partial pressure must be maintained at a level which will not permit excessive temperature rises.

The method of the invention may also comprise an additional step. This additional step comprises increasing the amount of oxygen-containing gas at the same temperature and pressure to provide an oxygen partial pressure within the range of about 0.3 to 1 atmosphere of oxygen for a period of time that is sufficient to eliminate any temperature rise that may occur in the bed when the amount of oxygen-containing gas is increased. While this latter step is not necessary in many applications of the method, such an additional step will insure that all pyrophoric material in the catalyst bed has been deactivated or stabilized prior to the termination of the proposed treatment and the subsequent removal of the catalyst from the reactor into the air, which would spontaneously ignite any active pyrophoric material.

It is contemplated that the catalyst bed temperature be maintained during the method within the range of about 100° to about 500° F. and that sufficient oxygen be added to provide an oxygen concentration within the range of about 0.1 volume percent to about 2.0 volume percent. The operating pressure should be maintained within the range of about atmospheric to about 5,000 p.s.i.g. Preferably, the operating pressure is within the range of about 150 p.s.i.g. to about 350 p.s.i.g.

Before removal of the treated catalyst from the reactor, the temperature may be lowered to 150° F., or less.

In an embodiment of the present invention, a reactor containing catalyst which has been used to hydrodesulfurize a petroleum naphtha is taken off stream. The reactor is purged with hydrogen-containing gas for a period of at least 15 minutes. The system is depressured and the reactor is purged for about 20 minutes with the inert gas. The system is then pressured with the inert gas to 235 p.s.i.g and inert gas is circulated through the reactor. The reactor is cooled so that the temperature at the bottom of the catalyst bed is at a temperature of about 300° F. and no other temperature measurements in the catalyst bed exceed 500° F. Then air is introduced into the inert gas stream to slowly obtain a maximum oxygen concentration of 0.5 mol percent or a flame-front temperature that does not exceed 375° F., whichever appears first. The flame-front temperature is an indication that the pyrophoric material in the bed of hydrodesulfurization catalyst is burning. The appropriate oxygen concentration is continued until the flame-front temperatures in the top of the catalyst bed fall below 325° F. Such a decrease in the flame-front temperature is an indication that the burning of the pyrophoric material has been completed. The oxygen concentration is slowly increased, approximately 0.5% every 30 minutes, to a value of 3%, and this oxygen concentration is maintained for 4 hours. After the 4 hours, the air and inert gas addition are stopped to indicate if the percent of oxygen in the circulating gas drops. Such a decrease in oxygen concentration indicates that burning still is present. If the oxygen concentration decreases more than 0.3% in one-half hour, the oxygen concentration of 3% is maintained for an additional 2 hours and the check is repeated. When no more burning is indicated, the reactor is cooled to a temperature of 100° to 150° F. while the 3% oxygen level is maintained.

This method of the present invention will adequately eliminate the pyrophoric materials, mostly iron sulfide, in the bed of the hydrodesulfurization catalyst. This embodiment is submitted herewith for the purpose of illustration only and is not intended to limit the scope of the present invention. Likewise, the following examples are presented for the purpose of illustration only and are not intended to limit the scope of the present invention.

EXAMPLE I

A 250-gram sample of coked catalyst obtained from a pilot plant hydrocracking unit and 74 grams of dried pyrophoric iron sulfide obtained from a commercial pipe still were admixed in a light virgin gas oil to form a slurry. This slurry was loaded into a pilot plant reactor fabricated out of 1¼-inch schedule 80 stainless steel pipe. The reactor was 90 inches in length and had an inside diameter of 1.278 inches. A co-axial thermowell having an outside diameter of ³⁄₁₆ inch extended down through the reactor. The catalyst bed, approximately 5 feet in length, was supported on a 6-inch layer of ¼-inch deactivated alumina balls. A preheat zone approximately 18 inches in length contained ¼-inch deactivated alumina balls and was located between the top of the reactor and the top of the catalyst bed. The reactor was electrically heated.

After the slurry of catalyst and pyrophoric iron sulfide had been charged to the reactor, the catalyst was tested for hydrocracking activity over a period of 6.8 days in the following manner. Hydrogen-containing gas, composed of both recycled gas and make-up hydrogen, was preheated, mixed with fresh hydrocarbon feed, and the gas-oil mixture was passed to a gas-oil preheater and then to the reactor. The effluent from the reactor was cooled and partially condensed in a cooler. The resulting two-phase mixture was separated at 1300 p.s.i.g. in a high pressure separator and the liquid stream from the high pressure separator throttled into a low pressure separator, which was maintained at 10 p.s.i.g. The light ends were passed overhead to a wet test meter and a vent. Samples of product were periodically obtained at a point down stream of the liquid-level control.

Following the activity test, hydrogen was circulated over the catalyst bed at a temperature of 680° F. for 11⅓ hours to strip any remaining hydrocarbons from the reactor. The catalyst bed was then purged with nitrogen and the catalyst temperature was adjusted to 150° F. at a pressure of 200 p.s.i.g. The nitrogen flow rate was 3.2 standard cubic feet of nitrogen per hour per pound of fresh catalyst. Mechanical problems were encountered in establishing a constant inert gas flow rate. As a result, the catalyst and iron sulfide were held at 150° F. in the flowing nitrogen for an additional 7 days. Then oxygen was added to the flowing nitrogen to provide an oxygen concentration of 0.1 mol percent. The introduction of oxygen resulted in a 10° F. temperature rise which moved through the bed of catalyst and iron sulfide in about 3½ hours. After 4 hours, the temperature rise had disappeared, which indicated that no further reaction was occurring. Oxygen concentration was varied over a period of time to complete the deactivation procedure. The conditions employed throughout the entire procedure are presented in Table I.

TABLE I.—DEACTIVATION PROCEDURE AND DATA

| Oxygen conc., mol percent: | Time, hours | Temp. rise |
|---|---|---|
| 0.1 | 2 | Yes. |
| 0.2 | 2 | Yes. |
| 0.3 | 2 | No. |
| 0.4 | 2 | No. |
| 0.5 | 15 | No. |
| 0.7 | 2 | No. |
| 0.9 | 2 | No. |
| 1.1 | 2 | No. |
| 2.0 | 2 | No. |
| 2.0-4.5 | 18 | No. |
| 5.0 | 2 | No. |

When the treatment, as defined in Table I, had been completed, the catalyst and iron sulfide were dumped from the reactor. The iron sulfide was separated from the catalyst particles under an inert atmosphere and then passed in air at room temperature. No noticeable reaction occurred. The powder was then heated to a temperature of 300° F. in air; however, no reaction was observed. These results indicate that the pyrophoric iron sulfide had been deactivated or stabilized by the above-described treatment.

The catalyst which had been mixed with the pyrophoric iron sulfide was then subjected to a subsequent activity test. It was found that the operating temperature required for the same amount of conversion as shown in the previous activity test, 77% conversion, with the same feedstocks was only 5° F. higher. There was no deleterious affect on the selectivity to light and heavy naphtha. This indicates that the deactivation by the method employed, an embodiment of the process of the present invention, did not appreciably affect the performance of the hydrocracking catalyst.

EXAMPLE II

In this embodiment of the method of the present invention, the catalyst in two parallel commercial-hydrodesulfurization reactors were treated to deactivate pyrophoric iron sulfide contained therein. The reactor had been in service for approximately 1 year.

The unit was removed from operation, reactor temperatures were reduced from about 700° F. to 600° F., and hydrocarbons being fed to the unit were stopped. The reactors were purged with hydrogen-containing gas for about 15 minutes at a pressure of 200 p.s.i.g. They were then depressed and purged for 1 hour with inert gas, said gas being at a temperature of 300° F. The system was subsequently pressured to 235 p.s.i.g. with inert gas and gas circulation was established at a rate of 5.7 standard cubic feet of inert gas per hour per pound of catalyst. The reactor inlets were cooled to a temperature of 300° F.

Air was added to the inert gas to provide an oxygen concentration of 0.5 mol percent. After about 4 hours, the flame-front had passed through the catalyst beds. The concentration of oxygen was then increased over a period of 40 hours to 3.0 mol percent, while a flame-front temperature of 450° F. was not exceeded. Subsequently, gas containing 3.0 mol percent oxygen was circulated through the reactor for 4 hours. Nitrogen was then substituted for the inert gas make-up and the catalyst bed was cooled to 100° F., while the oxygen concentration of 3.0 mol percent was maintained.

The reactor was then depressed and the catalyst was dumped. No problem occurred when the catalysts was dumped. Any pyrophoric material in the catalyst beds had been deactivated.

EXAMPLE III

Samples of catalyst and iron sulfide were removed from a commercial desulfurizer, which catalyst and iron sulfide had been stabilized in a manner similar to that employed in Example II. The stabilized material was tested in the laboratory and found to have an ignition temperature of 560° to 580° F. This catalyst, which had been removed from service after 5 months because of a pressure-drop problem, was tested in the pilot plant and found to have essentially 100% of fresh hydrodesulfurization catalyst activity.

EXAMPLE IV

In this embodiment of the method of the present invention, the catalyst in a commercial hydrocracking unit was treated to deactivate pyrophoric iron sulfide contained therein. The catalyst had been in service for approximately 2 years.

The unit was removed from operation, reactor temperatures were reduced from about 670° F. to about 620° F., and recycle oil and fresh feed were stopped. Recycle gas was then circulated for 3 hours at a pressure of about 1875 p.s.i.g. Then the reactor inlet temperature was raised to 700° F. and held at that level for 12 hours. The pressure in the system was reduced to 250 p.s.i.g. at a rate of 100 p.s.i. per 15 minutes. When the pressure reached 300 p.s.i.g. nitrogen purge gas was introduced at a rate of 100,000 standard cubic feet per hour. Nitrogen circulation was continued at a temperature of 600° F. for 8 hours while adding 100,000 standard cubic feet of nitrogen purge per hour. The beds of catalyst in the reactor were then cooled to a temperature of 150° F. at a rate of 40° F. per hour. This cooling required approximately 16 hours. Both the recycle furnaces and recycle gas compressor were shut down and the system was depressed. The system was then pressured to 250 p.s.i.g. with nitrogen, gas circulation of 8.9 standard cubic feet of nitrogen per hour per pound of catalyst was established, and the high-pressure-separator temperature was maintained at a value of 100° F. to 110° F. The reactor inlets were heated to a temperature of 250° F.

Air was added to the nitrogen gas to provide an oxygen concentration of 0.1 mol percent and circulation at this oxygen concentration was maintained for 30 minutes at a maximum temperature of 350° F. Air was then added to provide a maximum oxygen concentration of 0.5 mol percent and to establish a flame-front of 300° F. When the flame-front had passed through the catalyst, the reactor inlet temperature was increased from 250° to 300° F. The concentration of oxygen was then increased over a period of 10 hours to 4.5 mol percent and gas at this oxygen concentration was circulated through the reactor for 2 hours. After it had been ascertained that the oxygen concentration would not decrease, the catalyst bed was cooled to 100° F., while the oxygen concentration of 4.5 mol percent was maintained. The system was then depressed to 3 to 5 p.s.i.g. The reactor was then repressured to 250 p.s.i.g. at an oxygen concentration of 4.5 mol percent.

The reactor was then depressed and the catalyst was dumped. No problem occurred when the catalyst was dumped. Any pyrophoric material in the catalyst bed had been deactivated.

What is claimed is:

1. A method for stabilizing pyrophoric materials in a catalyst bed wherein iron sulfide is present, said pyrophoric materials having accumulated, along with coke, in said catalyst bed during the use of said catalyst bed for the conversion of petroleum hydrocarbons, which method consists essentially of the following steps in sequence: (1) passing an inert gas through said bed at a bed temperature that is within the range of about 100° F. to about 500° F. and that is below both the ignition temperature of coke and the ignition temperature of any additional combustible material that is not pyrophoric and at an operating pressure that is within the range of about atmospheric to about 5,000 p.s.i.g.; (2) adding a controlled amount of an oxygen-containing gas to said inert gas to provide sufficient oxygen to oxidize said pyrophoric materials, and bed temperature being maintained below said ignition temperatures and said sufficient oxygen being added to provide an oxygen concentration with the range of about 0.1 volume percent to about 2.0 volume percent; and (3) maintaining said controlled amount of oxygen-containing gas until any temperature rise that occurs in said bed has been eliminated.

2. The method of Claim 1, which method further comprises increasing the amount of oxygen-containing gas at the same temperature and pressure to provide an oxygen partial pressure within the range of about 0.3 to 1 atmosphere of oxygen for a period of time that is sufficient to eliminate any temperature rise that occurs in said bed when the amount of oxygen-containing gas is increased.

3. The method of Claim 1 wherein the operating pressure is within the range of about 150 p.s.i.g. to about 350 p.s.i.g.

4. The method of Claim 1 wherein said pyrophoric materials comprise pyrophoric iron sulfide.

5. The method of Claim 2 wherein said pyrophoric materials comprise pyrophoric iron sulfide.

6. The method of Claim 2 wherein said operating pressure is within the range of about 150 p.s.i.g. to about 350 p.s.i.g.

References Cited

UNITED STATES PATENTS

| | | | |
|---|---|---|---|
| 2,677,668 | 5/1954 | Ahlberg | 252—477 Q |
| 2,677,669 | 5/1954 | Ahlberg | 252—477 Q |
| 3,033,802 | 5/1962 | Pedigo | 252—477 Q |
| 3,235,511 | 2/1966 | Derr, Jr. | 252—419 |
| 3,573,201 | 3/1971 | Annesser et al. | 208—251 H |

FOREIGN PATENTS

| | | | |
|---|---|---|---|
| 171,976 | 10/1921 | Great Britain | 252—472 |

DANIEL E. WYMAN, Primary Examiner

P. E. KONOPKA, Assistant Examiner

U.S. Cl. X.R.

208—108, 251 H

UNITED STATES PATENT OFFICE
CERTIFICATE OF CORRECTION

PATENT NO. : 3,838,066

DATED : September 24, 1974

INVENTOR(S) : Lyle M. Lovell

It is certified that error appears in the above-identified patent and that said Letters Patent are hereby corrected as shown below:

Column 6, line 6, "purge per hour." should be -- purge gas per hour. --;

" 6, " 53, "materials, and" should be -- materials, said --;

" 6, " 56, "with" should be -- within --.

Signed and Sealed this eighth Day of June 1976

[SEAL]

Attest:

RUTH C. MASON
Attesting Officer

C. MARSHALL DANN
Commissioner of Patents and Trademarks